UNITED STATES PATENT OFFICE

2,165,692

HETEROCYCLIC FORMYLMETHYLENE COMPOUNDS

Leslie G. S. Brooker, Rochester, N. Y., assignor to Eastman Kodak Company, Rochester, N. Y., a corporation of New Jersey No Drawing. Application March 25, 1938, Serial No. 198,106

8 Claims. (Cl. 260—284)

This invention relates to new heterocyclic formylmethylene compounds. This application is a continuation-in-part of my copending application Serial No. 95,925, filed August 13, 1936.

It has been reported that formylmethylene derivatives of 1,3,3-trimethyl-2-methylenindoline can be prepared by treating 1,3,3-trimethyl-2-methylenindoline with methylformyl aniline, in the presence of a chlorine-containing acid condensation agent, e. g. phosphorous oxychloride. This method does not suffice, however, to prepare formylmethylene derivatives of other heterocyclic compounds. It is accordingly an object of my invention to provide new heterocyclic formylmethylene compounds and a process for the preparation thereof. Other and more specific objects will appear hereinafter.

The new heterocyclic formylmethylene compounds of my invention can be represented by the following general formulas:

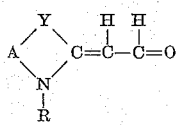

and

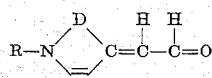

wherein A represents a divalent organic radical or group, such as a vinylene group, for example an unsubstituted vinylene group, a methylvinylene group, a phenylvinylene group, a methylphenylvinylene group, or a diphenylvinylene group, or a phenylene group, for example an unsubstituted phenylene group, a methylphenylene group, a dialkylaminophenylene group or a chlorophenylene group when Y represents oxygen, sulfur or selenium or a vinylene group, and A represents an ethylene group when Y represents sulfur or selenium, and A represents a naphthylene group, for example an $\alpha$- or $\beta$-naphthylene group when Y represents oxygen or sulfur or a vinylene group. D represents a divalent organic radical such as a vinylene or a phenylene group for example and R represents an alkyl group or alcohol radical, such as methyl, ethyl, n-propyl, isoamyl, allyl, $\beta$-ethoxyethyl, $\beta$-carbethoxyethyl, $\beta$-chloroethyl, benzyl or decyl for example.

In preparing my new compounds according to my invention, I subject to hydrolysis, as described in my aforesaid copending application, a cyclammonium quaternary salt having in its alpha or gamma position, i. e. in one of its so-called reactive positions, a $\beta$-arylaminovinyl group. As described in my aforesaid application, the hydrolysis is advantageously accelerated or catalyzed by either acids or alkalies. The alkaline hydrolysis is preferred, since it gives rise to purer products. Heat accelerates the hydrolysis. The hydrolysis is advantageously carried out in the presence of a diluent. Alcohols, particularly lower aliphatic alcohols of the formula $C_2H_{2n+1}OH$, wherein $n$ represents a positive integer not greater than four, are advantageously employed as diluents. As alkalies, alkali metal hydroxides such as potassium or sodium hydroxide, are advantageously employed. However, sodium or potassium carbonate, for example, can be employed.

As $\beta$-arylaminovinyl compounds, I advantageously employ $\beta$-phenylaminovinyl ($\beta$-anilinovinyl) compounds. $\beta$-naphthylaminovinyl compounds can be employed. The $\beta$-arylaminovinyl compounds can be employed in their acylated form. For example, $\beta$-acetanilidovinyl, $\beta$-propionanilidovinyl, $\beta$-butyranilidovinyl or $\beta$-benzanilidovinyl compounds are well known substances. In connection with the formylmethylene compounds described hereinafter, a number of $\beta$-arylaminovinyl compounds and their preparation will be set forth.

While the process of my invention is subject to variation, particularly as respects the nature and quantity of $\beta$-arylaminovinyl compound employed, the alkali or acid, if any, employed in accelerating the hydrolysis, the time of reaction, the temperatures employed, the nature and quantity of diluent employed, if any, and the method of isolation and purification of the formylmethylene compounds, the following examples will serve to illustrate the manner of practicing my invention. These examples are not intended to limit the scope of my invention.

EXAMPLE 1.—*1-ethyl-2-formylmethylene-$\beta$-naphthothiazoline*

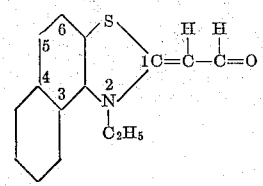

4.6 g. (1 mol.) of 2-($\beta$-anilinovinyl)-$\beta$-naphthothiazole ethiodide were dispersed in 50 cc. of 95% ethyl alcohol. To this dispersion were added 50 cc. of a 40% (weight) solution of sodium hydroxide in water. The resulting mixture was heated at the refluxing temperature for about 15 hours. At the end of this time, the reaction mixture separated into two liquid layers upon cooling. The alcoholic layer was separated off and concentrated to small bulk. The gummy semi-solid residue became crystalline on stirring with a little ether. After washing with water, recrystallization was effected from n-propyl alcohol. The recrystallized product melted at 157° to 160° C. with decomposition.

EXAMPLE 2.—*1-ethyl-2-formylmethylene-β-naphthothiazoline*

2.91 g. (2.2 mol.) of powdered potassium hydroxide (85%) were dissolved in 100 cc. of ethyl alcohol (95%) by warming on a steam bath, under reflux. When solution was attained, 10 g. (1 mol.) of 2-(β-acetanilidovinyl)-β-naphthothiazole ethiodide were added while agitating the solution. The resulting mixture was heated, at the refluxing temperature, for about six minutes. At the end of this time, most of the alcohol was removed by distillation under sub-atmospheric pressure. A small amount of methyl alcohol and then 100 cc. of water were added to the residue. The resulting mixture was chilled to 0° C. for several hours and then the solid formylmethylene compound filtered off and washed with water. The crude formylmethylene compound was extracted with boiling ligroin (B. P. 90° to 120° C.). The extract upon cooling yielded the formylmethylene compound as yellow crystals. The product melted somewhat higher than that of Example 1 and over a narrower range. It was probably purer than the product of Example 1.

The same formylmethylene compound was prepared by heating at the refluxing temperature for about 2.25 hours, 4.58 g. (1 mol.) of 2-(β-anilinovinyl)-β-naphthothiazole ethiodide in 30 cc. of ethyl alcohol (95%) containing 0.73 g. (1.1 mol.) of powdered potassium hydroxide. The formylmethylene compound was isolated and purified as described in the fore part of this example.

2-(β-anilinovinyl)-β-naphthothiazole ethiodide was prepared by fusing an intimately ground mixture of 71 g. (1 mol.) of 2-methyl-β-naphthothiazole ethiodide with 39.2 g. (1 mol.) of diphenylformamidine at 160° to 170° C. for 15 minutes. The product was recrystallized from methyl alcohol.

The 2-(β-acetanilidovinyl)-β-naphthothiazole ethiodide was prepared by heating 22.9 g. of 2-(β-anilinovinyl)-β-naphthothiazole ethiodide in 100 cc. of acetic anhydride at the refluxing temperature for about 15 minutes. The reaction mixture was chilled to 0° C. The β-acetanilidovinyl compound separated. It was filtered off and washed with acetone.

EXAMPLE 3.—*2-formylmethylene-1-methyl-1,2-dihydroquinoline*

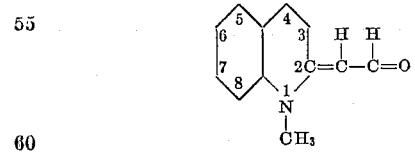

3.88 g. (1 mol.) of 2-(β-acetanilidovinyl)-quinoline methiodide were added to a hot solution of 0.73 g. (1.1 mol.) of powdered potassium hydroxide (85%) in 30 cc. of ethyl alcohol (95%). The resulting mixture was agitated and heated at the refluxing temperature for about 20 minutes. The moist crude formylmethylene compound isolated as in Example 2 was extracted with boiling ligroin (B. p. 90° to 120° C.). Upon cooling the extract, the formylmethylene compound separated as orange crystals which melted at 87 to 90° C. This formylmethylene compound is not very stable, and should be used as soon after preparation as possible.

EXAMPLE 4.—*2-ethyl-1-formylmethylene-benzothiazoline*

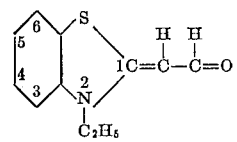

9.0 g. (1 mol.) of 1-(β-acetanilidovinyl)-benzothiazole ethiodide were added to a hot solution of 2.91 g. (2.2 mol.) of powdered potassium hydroxide (85%) in 100 cc. of ethyl alcohol (95%). The resulting mixture was agitated and heated at the refluxing temperature for about 5 minutes. The formylmethylene compound was isolated and purified as in Example 2 and obtained as yellow crystals which melted at 83° to 85° C. After obtaining this formylmethylene compound from the ligroin extract, the compound is advantageously further recrystallized from the ligroin once or twice.

The 1-(β-acetanilidovinyl)-benzothiazole ethiodide can be prepared by heating, at the refluxing temperature for about 20 minutes, 48 g. (1 mol.) of diphenylformamidine and 67 g. (1 mol.) of 1-methylbenzothiazole ethiodide in about 365 cc. of acetic anhydride. The β-acetanilidovinyl compound separated from the chilled reaction mixture. It was filtered off, washed with acetone and dried.

EXAMPLE 5.—*2-ethyl-1-formylmethylene-benzoselenazoline*

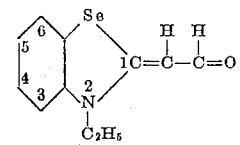

2.49 g. (1 mol.) of 1-(β-acetanilidovinyl)-benzoselenazole ethiodide were added to a hot solution of 0.73 g. (2.2 mol.) of powdered potassium hydroxide (85%) in 35 cc. of ethyl alcohol (95%). The resulting mixture was agitated and heated at the refluxing temperature for about 5 minutes. The formylmethylene compound was isolated and extracted with ligroin as in Example 2. However, upon cooling the ligroin extract, the formylmethylene compound separated as a sticky layer. The yellowish sticky material was dried in a vacuum desiccator over paraffin wax when it became crystalline.

The 1-(β-acetanilidovinyl)-benzoselenazole ethiodide was prepared by heating 7.04 g. (1 mol.) of 1-methylbenzoselenazole ethiodide and 4.7 g. (1.2 mol.) of diphenylformamidine in 25 cc. of acetic anhydride at the refluxing temperature for 10 minutes. Upon cooling, the product separated from the reaction mixture. It was filtered off and washed with acetone.

EXAMPLE 6.—*2-formylmethylene-3,4-dimethyl-Δ⁴-thiazoline*

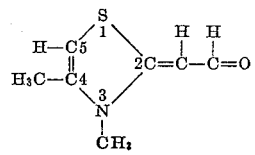

4.0 g. (1 mol.) of 2-(β-acetanilidovinyl)-4-methyl-thiazoline methiodide were added to a hot solution of 1.46 g. (2.2 mol.) of powdered potassium hydroxide (85%) in 35 cc. of ethyl alcohol (95%). The resulting mixture was agitated and heated at the refluxing temperature for about 7 minutes. The formylmethylene compound was isolated and purified as in Example 2 and obtained as yellow crystals. It is advantageously recrystallized from the ligroin after separation from the ligroin in the first instance. It melted at 140° to 141° C.

2-(β-anilinovinyl)-4-methylthiazole methiodide was prepared by fusing an intimate mixture of 7.65 g. (1 mol.) of 2,4-dimethylthiazole methiodide with 5.88 g. (1 mol.) of diphenylformamidine at 150° C. for about three minutes. The cooled reaction mass was ground with acetone, filtered and washed with acetone. It was recrystallized from methyl alcohol and melted at 255° to 256° C. with decomposition.

The 2-(β-acetanilidovinyl)-4-methylthiazole methiodide was prepared by heating 7.15 g. of 2-(β-anilinovinyl)-4-methylthiazole methiodide in 20 cc. of acetic anhydride at the refluxing temperature for about 5 minutes. The cooled reaction mixture was stirred with 150 cc. of ether and chilled at 0° C. The β-acetanilidovinyl compound separated. It was boiled with acetone and finally filtered from the acetone mixture chilled to 0° C.

EXAMPLE 7.—*2-formylmethylene-3-methyl-thiazolidine*

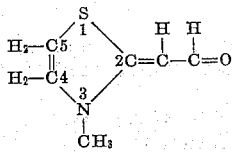

7.76 g. (1 mol.) of 2-(β-acetanilidovinyl)-thiazolidine methiodide were added to a hot solution of 2.91 g. (2.2 mol.) of powdered potassium hydroxide (85%) in 35 cc. of ethyl alcohol (95%). The resulting mixture was agitated and heated at the refluxing temperature for about 10 minutes. The formylmethylene compound was isolated and purified as in Example 2. After it separates from the ligroin extract, it is advantageously further recrystallized twice from the ligroin. It was obtained as yellow crystals melting at 85° to 88° C.

The 2-(β-acetanilidovinyl)-thiazolidine methiodide was prepared by heating, at about 100° C. for about 15 minutes, an intimately ground mixture of 159 g. (1 mol.) of 2-methylthiazolidine methiodide and 135 g. (1.05 mol.) of diphenylformamidine in about 220 cc. of glacial acetic acid. The reaction product separated from the cooled reaction mixture. It was then heated in sufficient acetic anhydride to form a solution for about 15 minutes. One molecular proportion of pyridine for each molecular proportion of reaction product is advantageously employed in the solution during refluxing. The 2-(β-acetanilidovinyl)-thiazolidine methiodide was precipitated from solution by adding diethyl ether. The precipitated tarry mass was stirred with acetone until crystalline.

EXAMPLE 8.—*2-formylmethylene-1,6-dimethyl-1,2-dihydroquinoline*

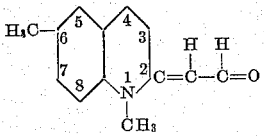

4.02 g. (1 mol.) of 2-(β-anilinovinyl)-6-methylquinoline methiodide were added to a hot solution of 0.73 g. (1.1 mol.) of powdered potassium hydroxide (85%) in 30 cc. of ethyl alcohol (95%). The resulting mixture was agitated and heated at the refluxing temperature for about 7 minutes. At the end of this time, the formylmethylene compound was isolated and purified as in Example 2. It is advantageously further twice recrystallized from the ligroin. It was obtained as shiny orange crystals melting at 118° to 120° C. with decomposition.

2-(β-anilinovinyl)-6-methylquinoline methiodide was prepared by fusing an intimate mixture of 40 g. (1 mol.) of 2,6-dimethylquinoline methiodide and 26 g. (1 mol.) of diphenylformamidine at 180° C. for about 7 minutes. The hard cake resulting from cooling the reaction mixture was ground with acetone. The solid material was filtered off and washed with acetone. It was recrystallized from methyl alcohol and obtained as light orange crystals melting at 278° to 281° C. with decomposition.

EXAMPLE 9.—*4-formylmethylene-1-methyl-1,4-dihydroquinoline*

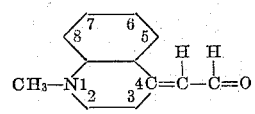

7.76 g. (1 mol.) of 4-(β-anilinovinyl)-quinoline methiodide were added to a hot solution of 1.46 g. (1.1 mol.) of potassium hydroxide (85%) in 50 cc. of ethyl alcohol (95%). The resulting mixture was agitated and heated at the refluxing temperature for about 20 minutes. At the end of this time, more of the alcohol was removed by distillation under sub-atmospheric pressure. A small amount of methyl alcohol was added to the residue. To the resulting mixture, 100 cc. of cold water was added and the whole was stirred. The aqueous mixture was then chilled at 0° C. for several hours. The solid formylmethylene compound was filtered off and washed with cold water. It was extracted with boiling ligroin (B. P. 90° to 120° C.) and separated from the extract upon chilling it to 0° C. as brownish crystals. This formylmethylene compound is not very stable and should be used as soon as possible.

4-(β-anilinovinyl)-quinoline methiodide was prepared by fusing an intimate mixture of 14.5 g. (1 mol.) of lepidine methiodide and 9.8. g. (1 mol.) of diphenylformamidine at 155° C. for about 5 minutes. The resulting cooled cake of crude product was ground with acetone, filtered and washed with acetone. The product was recrystallized from methyl alcohol.

EXAMPLE 10.—*1-formylmethylene-2-methylbenzoxazoline*

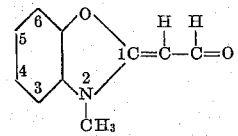

8.4 g. (1 mol.) of 1-(β-acetanilidovinyl)-benzoxazole methiodide were added to a hot solution of 2.92 g. (2.2 mol.) of potassium hydroxide in 75 cc. of ethyl alcohol (95%). The resulting mixture was agitated and heated at the refluxing temperature for about 7 minutes. The formylmethylene compound was isolated and purified as in Example 2. The formylmethylene compound separated from the ligroin extract as cream colored crystals which became sticky as they stood. This formylmethylene compound should be used as soon as possible.

1-(β-acetanilidovinyl) benzoxazole methiodide was prepared by heating at the refluxing temperature for about 20 minutes, 40 g. (1 mol.) of diphenylformamidine and 58 g. (1 mol.) of 1-methylbenzoxazole ethiodide in about 250 cc. of acetic anhydride. The 1-(β-acetanilidovinyl)-benzoxazole ethiodide separated from the chilled reaction mixture and was washed with acetone.

Formylmethylene compounds containing aralkyl, alkoxyalkyl and carbalkoxyalkyl groups attached to the nitrogen can be obtained in the manner illustrated in the above examples by employing cyclammonium aralkyl, alkoxyalkyl or carbalkoxyalkyl quaternary salts containing a reactive methyl group, converting these to β-arylaminovinyl compounds by condensation with diphenylformamidine or the like and subjecting the resulting β-arylaminovinyl compound to hydrolysis. A method for the preparation of cyclammonium aralkyl quaternary salts containing a reactive methyl group is described in the copending application of Leslie G. S. Brooker and Lloyd A. Smith, Serial No. 175,686, filed November 20, 1937 and a method for the preparation of cyclammonium alkoxyalkyl and carbalkoxyalkyl quaternary salts is described in the copending application of Leslie G. S. Brooker and Lloyd A. Smith, Serial No. 180,214, filed December 16, 1937.

As described in my copending application Serial No. 95,925, filed August 13, 1936, the formylmethylene compounds described herein can be condensed with cyclammonium quaternary salts containing a reactive methyl group, such as 1-methylbenzothiazole, 1-methylbenzoxazole, 1-methylbenzoselenazole, 2-methylquinoline, 4-methylquinoline, 2-methyl-β-naphthothiazole, 2-methyl-β-naphthoxazole, 1-methyl-α-naphthothiazole and 1-methyl-α-naphthoxazole quaternary salts for example, in the presence of a water-binding agent to give carbocyanine dyes. Both symmetrical and unsymmetrical carbocyanine dyes can be prepared. As water-binding agents, organic acid anhydrides, such as acetic, propionic or butyric anhydrides, are advantageously employed.

What I claim as my invention and desire to be secured by Letters Patent of the United States is:

1. A formylmethylene compound characterized by a formula selected from the group consisting of the following formulas:

wherein A represents a divalent organic radical selected from the group consisting of vinylene and phenylene groups when Y represents a divalent group selected from the group consisting of oxygen, sulfur and selenium atoms and vinylene groups, and A represents an ethylene group when Y represents a divalent group selected from the group consisting of sulfur and selenium atoms, and A represents a naphthylene group when Y represents a divalent group selected from the group consisting of oxygen and sulfur atoms and vinylene groups, D represents a divalent group selected from the group consisting of vinylene and phenylene groups and R represents an alkyl group.

2. A formylmethylene compound characterized by the following formula:

wherein D represents a divalent organic radical selected from the group consisting of vinylene and phenylene groups and R represents an alkyl group.

3. A formylmethylene compound characterized by the following formula:

wherein R represents an alkyl group.

4. 4-formylmethylene-1-methyl-1,4-dihydroquinoline.

5. A formylmethylene compound characterized by the following formula:

wherein R represents an alkyl group.

6. 2-formylmethylene-1-methyl-1,2-dihydroquinoline.

7. A formylmethylene compound characterized by the following formula:

wherein R represents an alkyl group.

8. 2-formylmethylene-3-methylthiazolidine.

LESLIE G. S. BROOKER.